(12) United States Patent
Maiyuran et al.

(10) Patent No.: US 10,410,081 B2
(45) Date of Patent: *Sep. 10, 2019

(54) METHOD AND APPARATUS FOR A HIGH THROUGHPUT RASTERIZER

(71) Applicant: INTEL CORPORATION, Santa Clara, CA (US)

(72) Inventors: Subramaniam Maiyuran, Gold River, CA (US); Thomas A. Piazza, New York, NY (US); Jorge F. Garcia Pabon, Folsom, CA (US); Shubh B. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/581,701

(22) Filed: Dec. 23, 2014

(65) Prior Publication Data

US 2016/0180585 A1 Jun. 23, 2016

(51) Int. Cl.
*G06K 9/46* (2006.01)
*G06T 15/00* (2011.01)

(52) U.S. Cl.
CPC .......... *G06K 9/4604* (2013.01); *G06T 15/005* (2013.01); *G06T 2210/12* (2013.01)

(58) Field of Classification Search
CPC combination set(s) only.
See application file for complete search history.

(56) References Cited

U.S. PATENT DOCUMENTS

| 5,303,340 | A | * | 4/1994 | Gonzalez-Lopez | G06T 15/80 |
| | | | | | 345/24 |
| 5,446,836 | A | * | 8/1995 | Lentz | G06T 11/40 |
| | | | | | 345/441 |
| 5,918,057 | A | * | 6/1999 | Chou | G06F 13/26 |
| | | | | | 710/260 |
| 5,982,384 | A | | 11/1999 | Prouty et al. | |

(Continued)

FOREIGN PATENT DOCUMENTS

| EP | 1811454 A2 | 7/2007 |
| JP | H08265760 A | 10/1996 |

OTHER PUBLICATIONS

International Search Report and the Written Opinion for Application No. PCT/US2015/062068, dated Apr. 22, 2016, 11 pages.

(Continued)

*Primary Examiner* — Motilewa Good Johnson
(74) *Attorney, Agent, or Firm* — Nicholson De Vos Webster & Elliott LLP

(57) ABSTRACT

An apparatus and method are described for a high throughput rasterizer. For example, one embodiment of an apparatus comprises: block selection logic to select a plurality of pixel blocks associated with edges of a primitive, the plurality of pixel blocks selected based on the pixel blocks having samples which are both inside and outside of the primitive; and edge determination logic to analyze samples of the plurality of pixel blocks selected by the block selection logic and responsively generate data identifying each edge of the primitive; and final mask determination logic to combine the data identifying each edge and generate a final mask representing the primitive.

24 Claims, 22 Drawing Sheets

(56) References Cited

U.S. PATENT DOCUMENTS

| | | | |
|---|---|---|---|
| 6,828,983 B1* | 12/2004 | Vijayakumar | G06T 3/4023 345/544 |
| 7,006,110 B2* | 2/2006 | Crisu | G06T 11/203 345/611 |
| 7,061,507 B1* | 6/2006 | Tuomi | G06T 11/40 345/611 |
| 7,119,809 B1 | 10/2006 | McCabe | |
| 7,804,499 B1 | 9/2010 | Molnar et al. | |
| 2002/0097241 A1* | 7/2002 | McCormack | G06T 11/40 345/423 |
| 2002/0171658 A1* | 11/2002 | Ramani | G06T 11/40 345/558 |
| 2005/0007365 A1 | 1/2005 | Cao | |
| 2005/0134603 A1* | 6/2005 | Iourcha | G06T 11/20 345/611 |
| 2006/0209065 A1* | 9/2006 | Lapidous | G06T 15/40 345/422 |
| 2007/0076965 A1 | 4/2007 | Shimada | |
| 2007/0165035 A1* | 7/2007 | Duluk, Jr. | G06T 1/60 345/506 |
| 2009/0027416 A1 | 1/2009 | Barone et al. | |
| 2014/0267373 A1* | 9/2014 | Kilgard | G06T 3/0012 345/611 |

OTHER PUBLICATIONS

Search Report from foreign counterpart Great Britain Patent Application No. 1522893, dated Mar. 17, 2016, 3 pages.
International Preliminary Report on Patentability for Application No. PCT/US2015/062068, dated Jul. 6, 2017, 8 pages.

* cited by examiner

FIG. 9A  SAMPLE COMMAND FORMAT
900
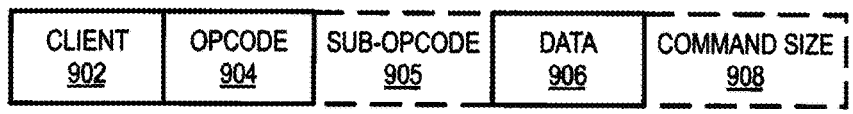
FIG. 9B  SAMPLE COMMAND SEQUENCE
910
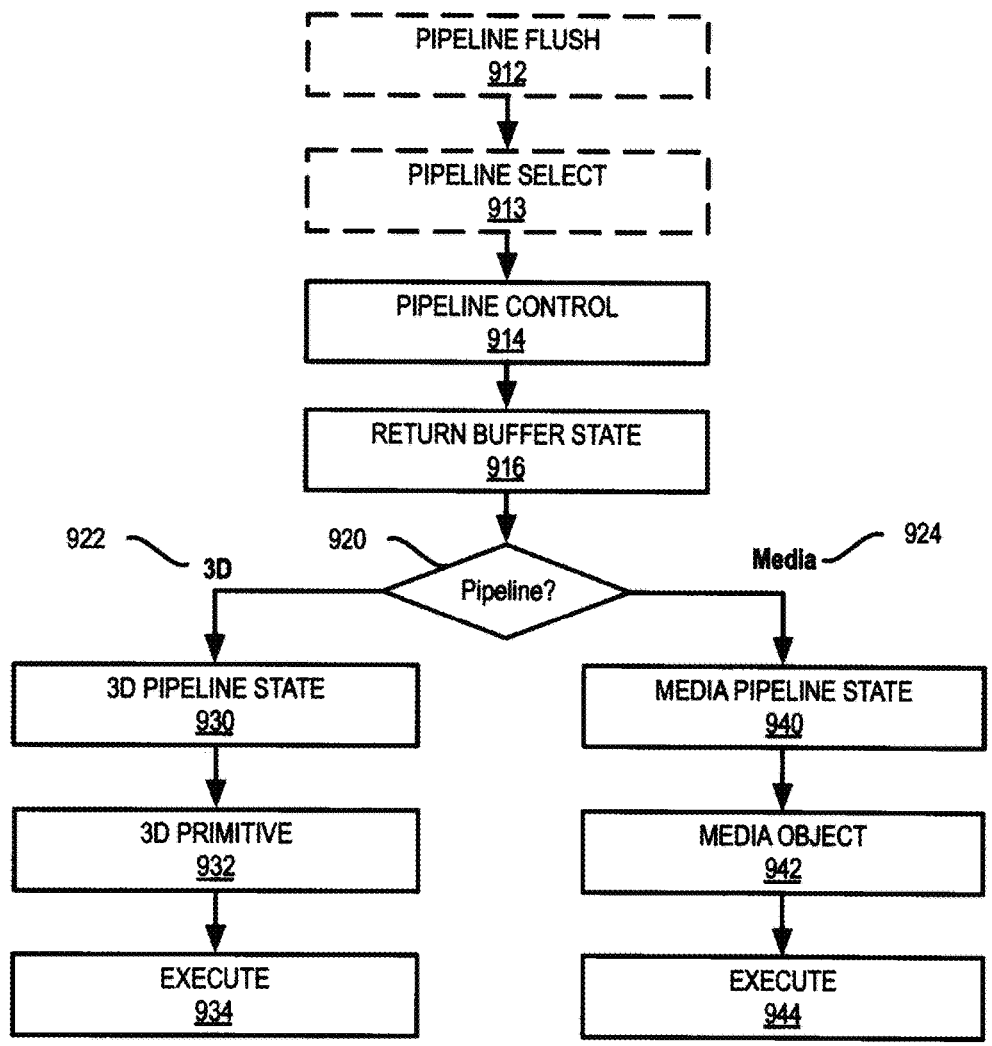

METHOD AND APPARATUS FOR A HIGH THROUGHPUT RASTERIZER

BACKGROUND

Field of the Invention

This invention relates generally to the field of computer processors. More particularly, the invention relates to an apparatus and method for a high throughput rasterizer.

Description of the Related Art

Rasterizing is a critical task of a graphics processing unit (GPU) in which an image described in a vector graphics format is converted into a raster image (e.g., pixels) for output on a display device. Rasterization often requires determining a list of lit samples of a primitive, which is a recurrent task that must be done efficiently to consume a minimum amount of power. Graphics techniques such as multisample anti-aliasing (MSAA) require a significant amount of graphics data to be processed without impacting the rendering time. Techniques have been applied to this problem but the throughout available using current solutions is insufficient to support new and future requirements.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

FIG. 19 illustrates additional layers of symmetry utilized to perform more efficient rasterization in one embodiment of the invention;

FIG. 20 illustrates additional layers of symmetry at the pixel level utilized to perform more efficient rasterization in one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures And Data Types

System Overview

Figure 1:
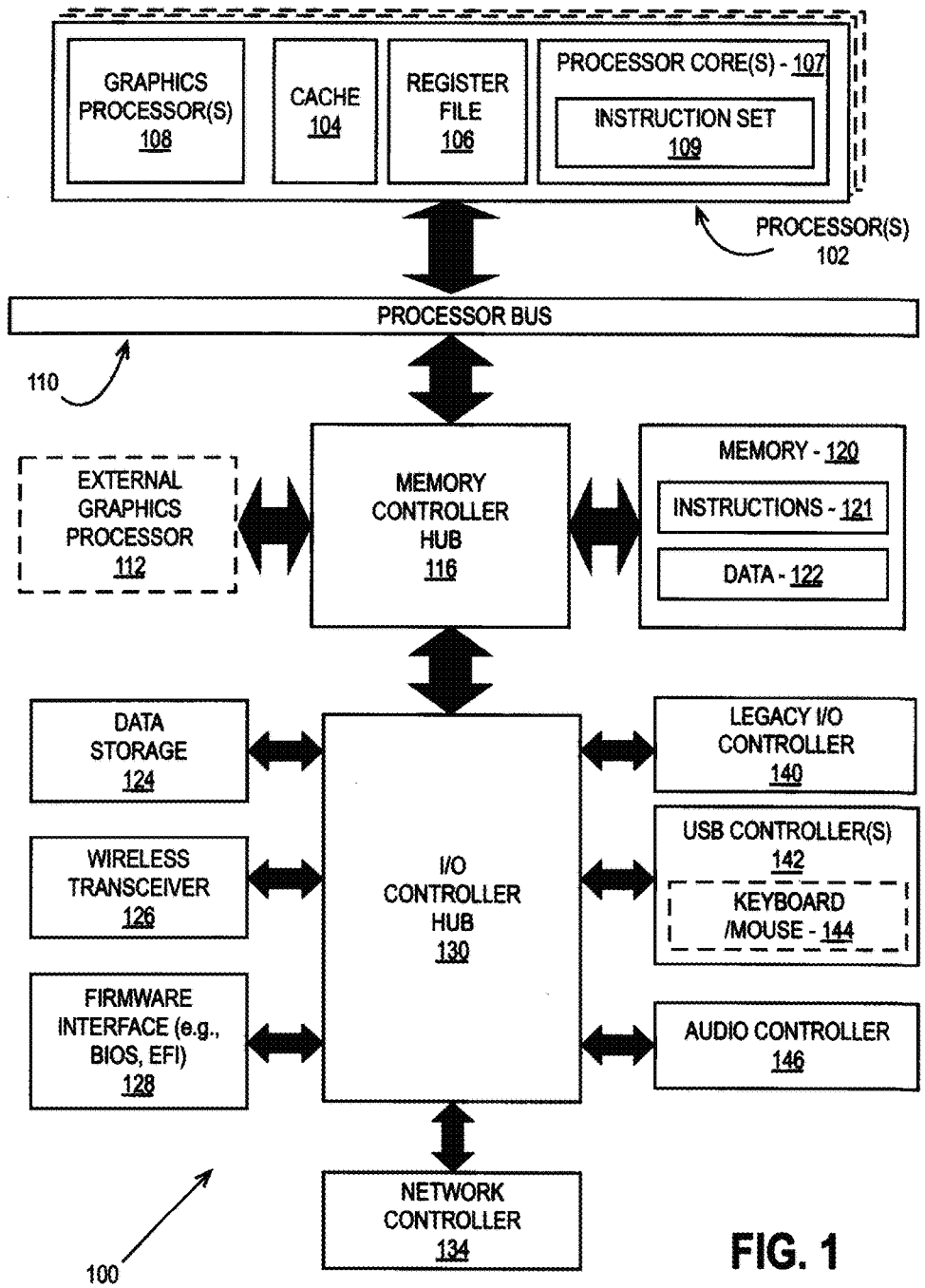
FIG. 1 is a block diagram of an embodiment of a computer system with a processor having one or more processor cores and graphics processors.

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
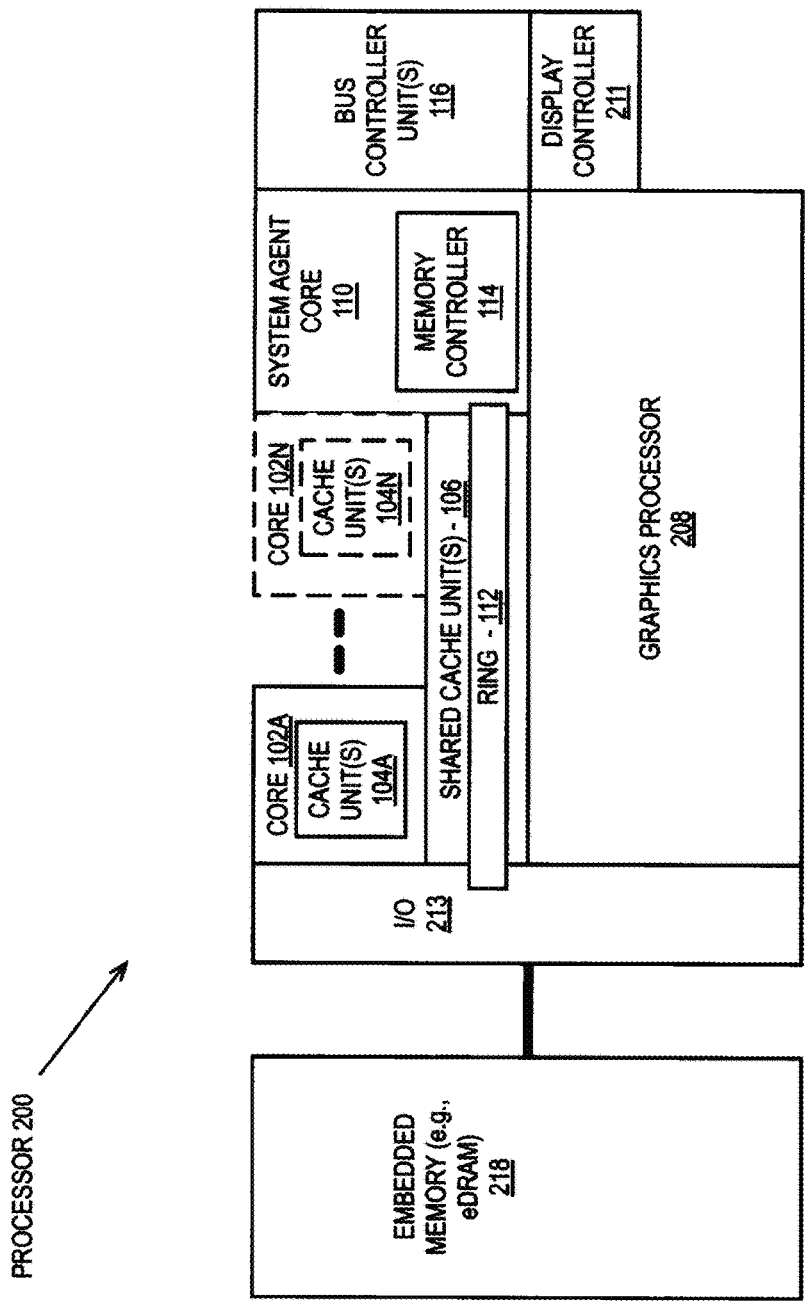
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/ Complementary metal-oxide-semiconductor (BiCMOS) or N-type metal-oxide-semiconductor logic (NMOS). Additionally, processor 200 can be implemented on one or more chips or as an SoC integrated circuit having the illustrated components, in addition to other components.

Figure 3:
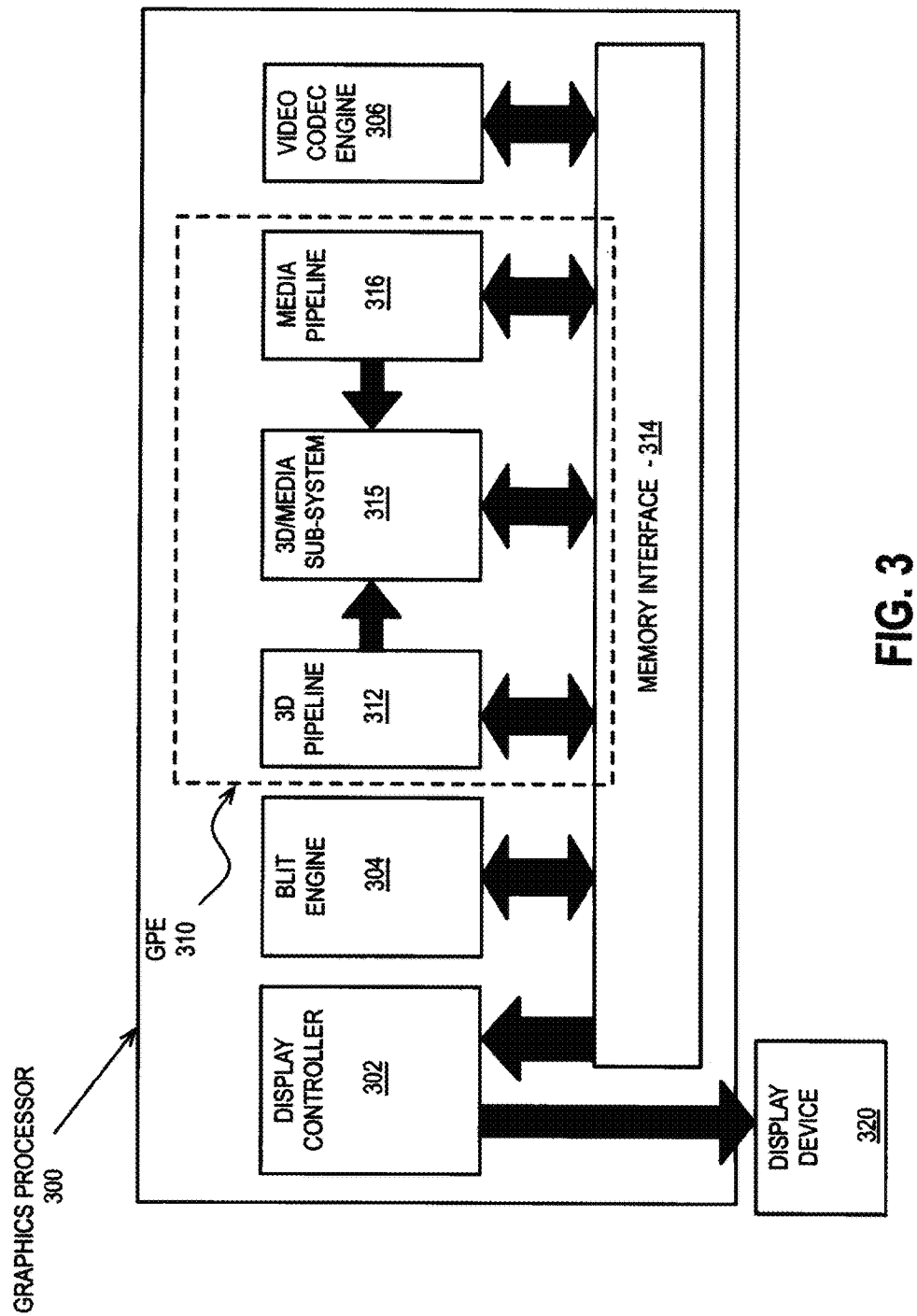
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
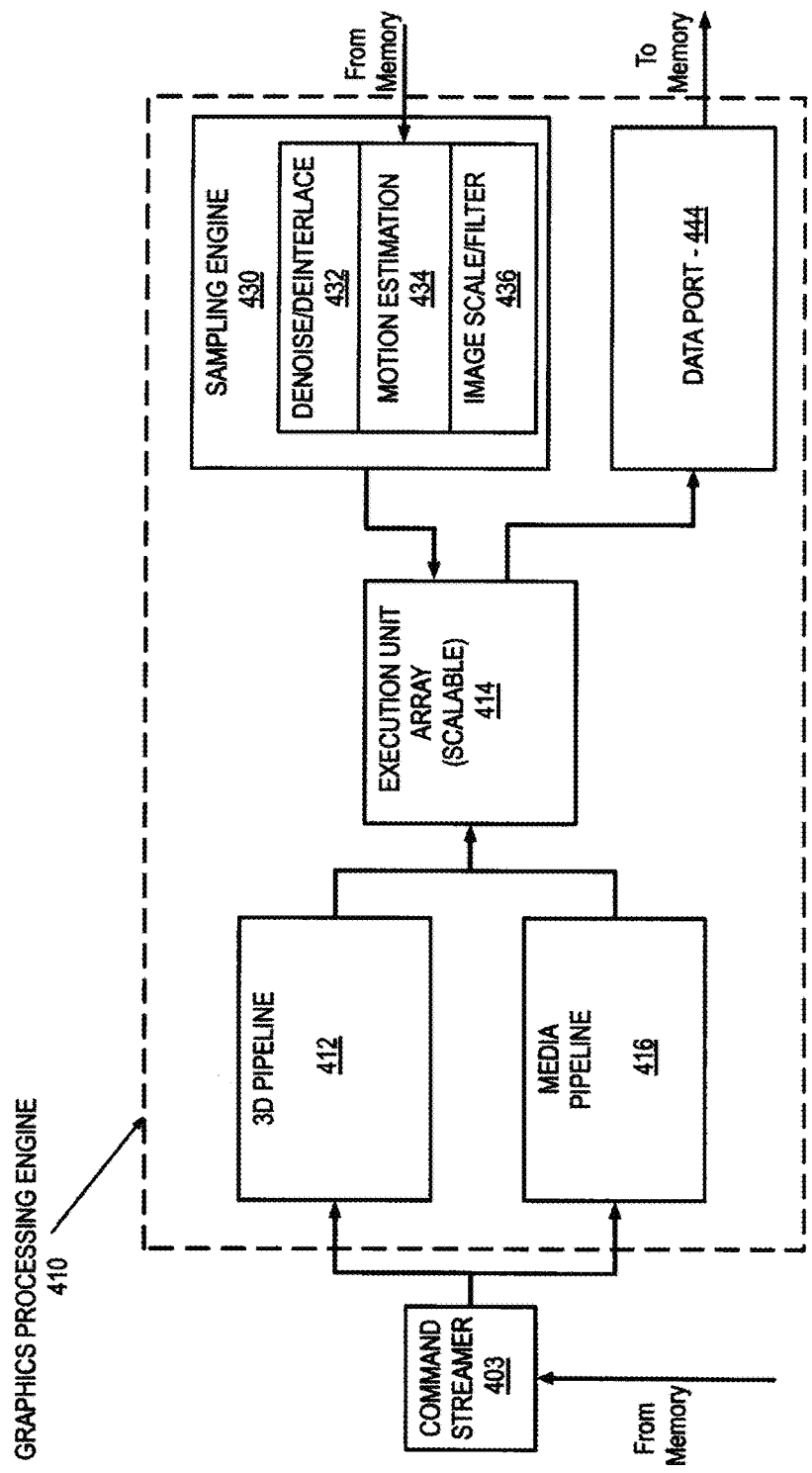
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
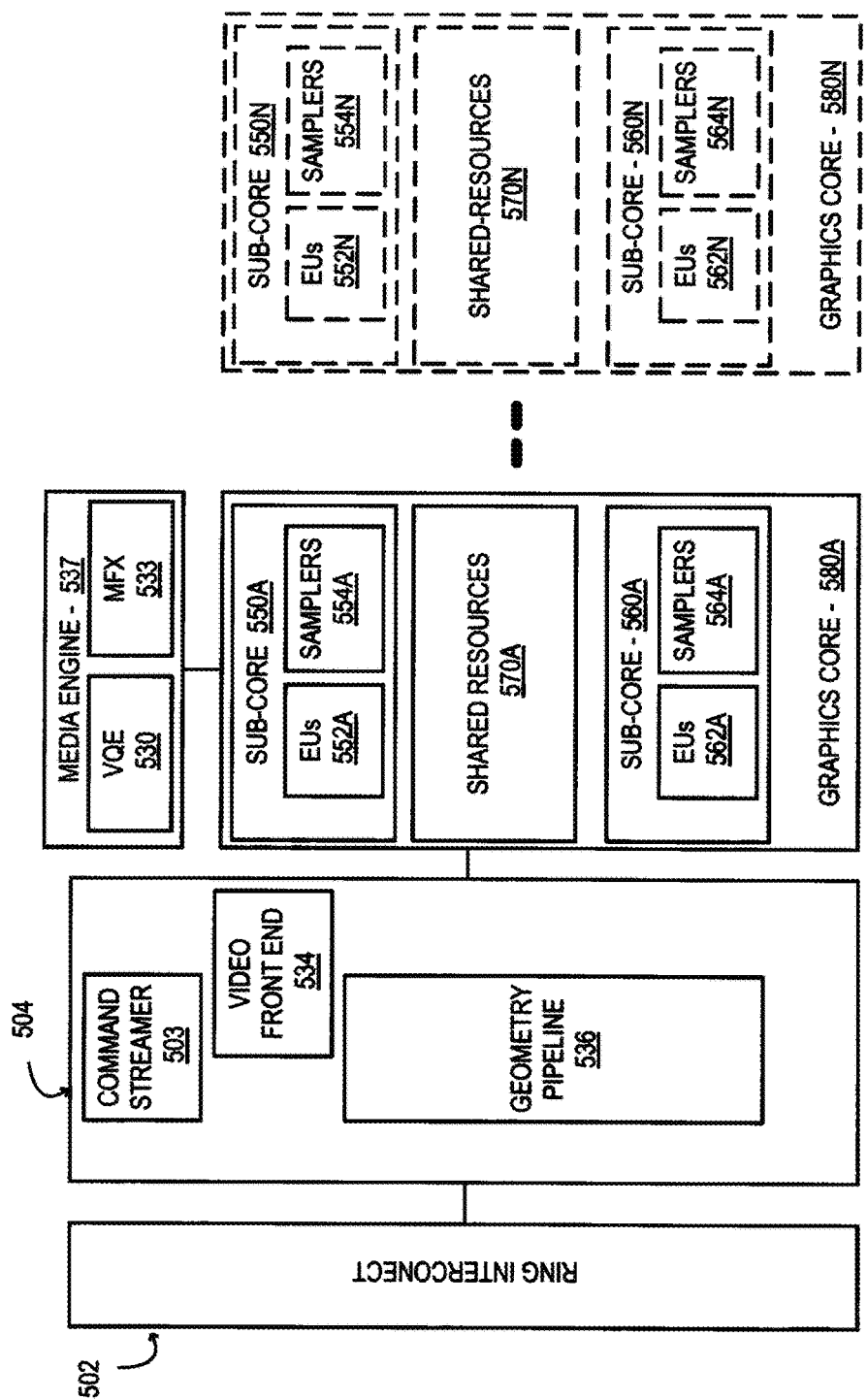
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
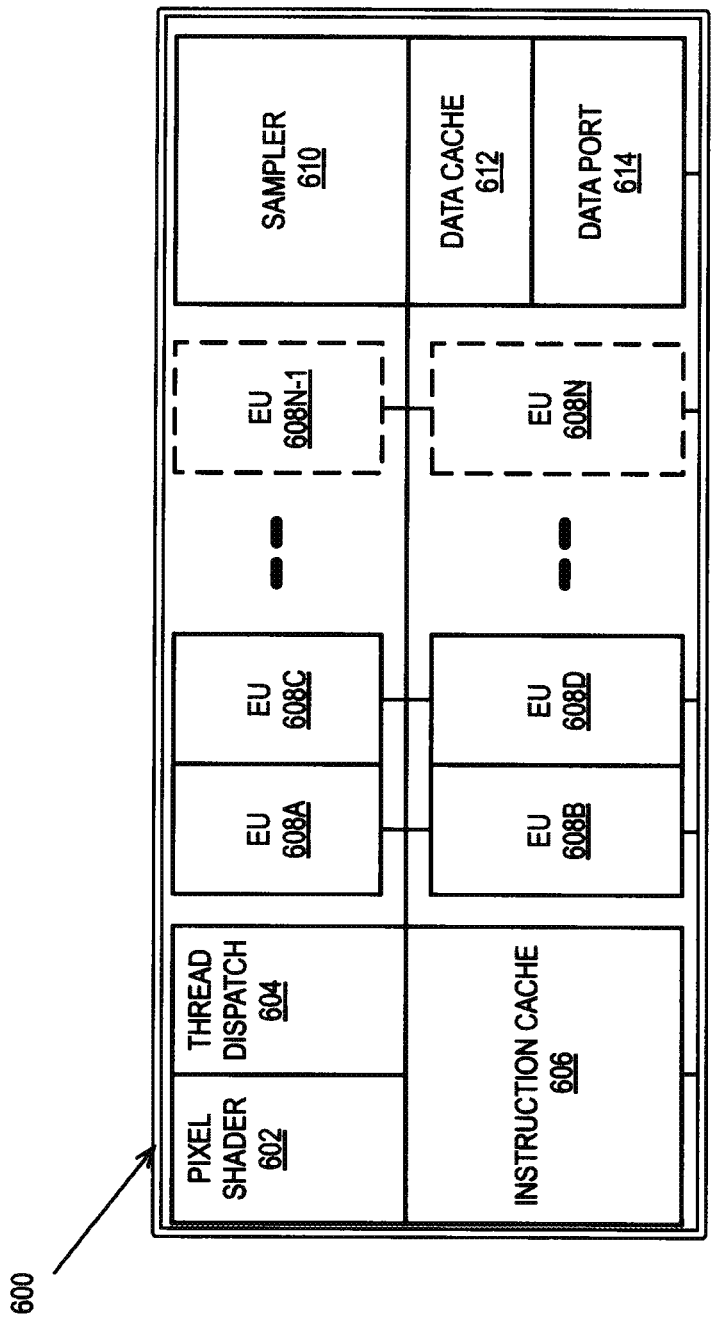
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
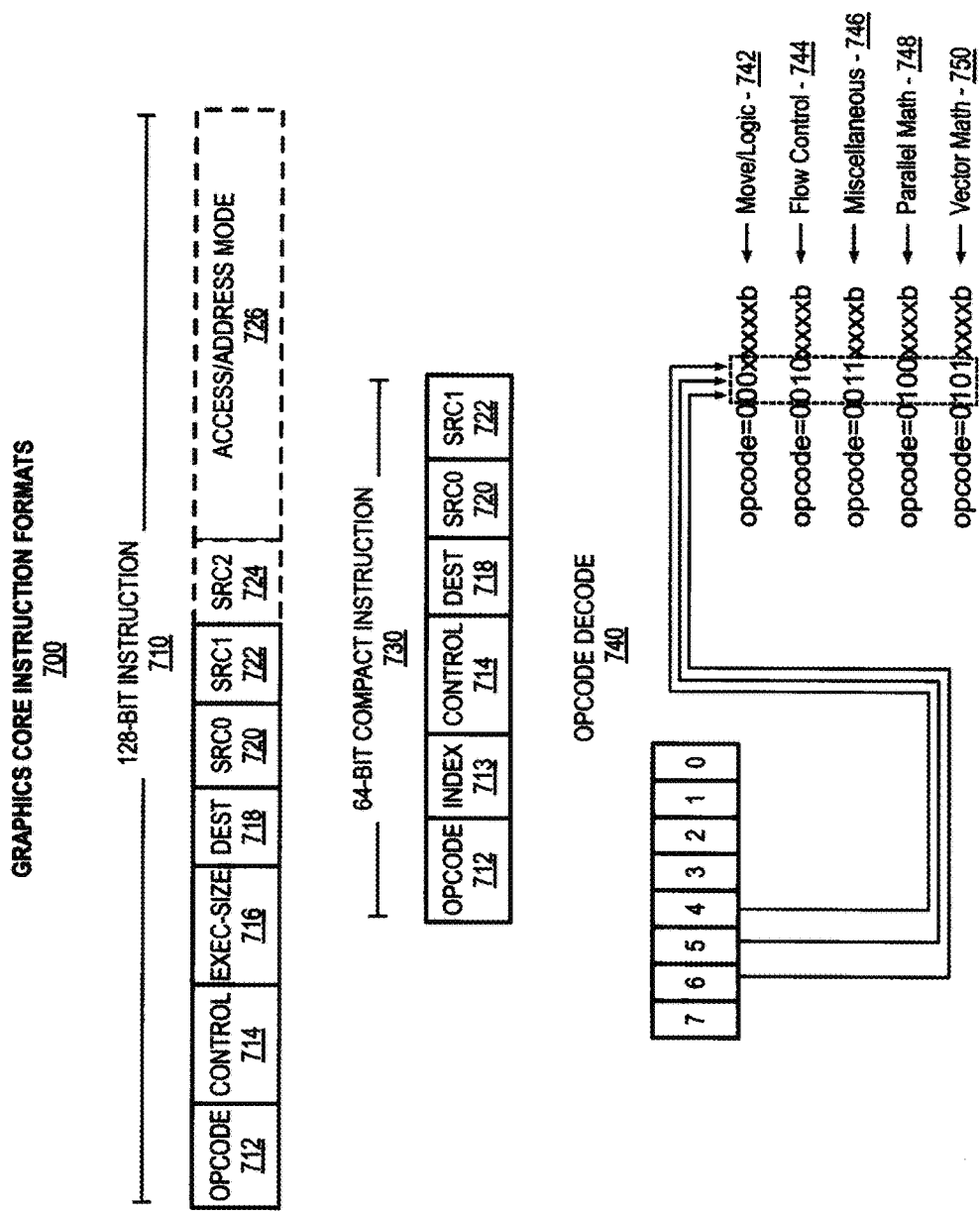
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes access/address mode information 726 specifying, for example, whether direct register addressing mode or indirect register addressing mode is used. When direct register addressing mode is used, the register address of one or more operands is directly provided by bits in the instruction 710. When indirect register addressing mode is used, the register address of one or more operands may be computed based on field 726, which specifies an address register value mode and/or an address immediate field in the instruction. In one embodiment the access/address mode information 726 may determine the operand mode to define a data access alignment for the instruction. For example, when in a first mode, the instruction 710 may use byte-aligned addressing for source and destination operands and, when in a second mode, the instruction 710 may use 16-byte-aligned access mode and 1-byte aligned addressing for all source and destination operands. access mode, where the byte alignment of the access mode determines the access alignment of the instruction operands.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
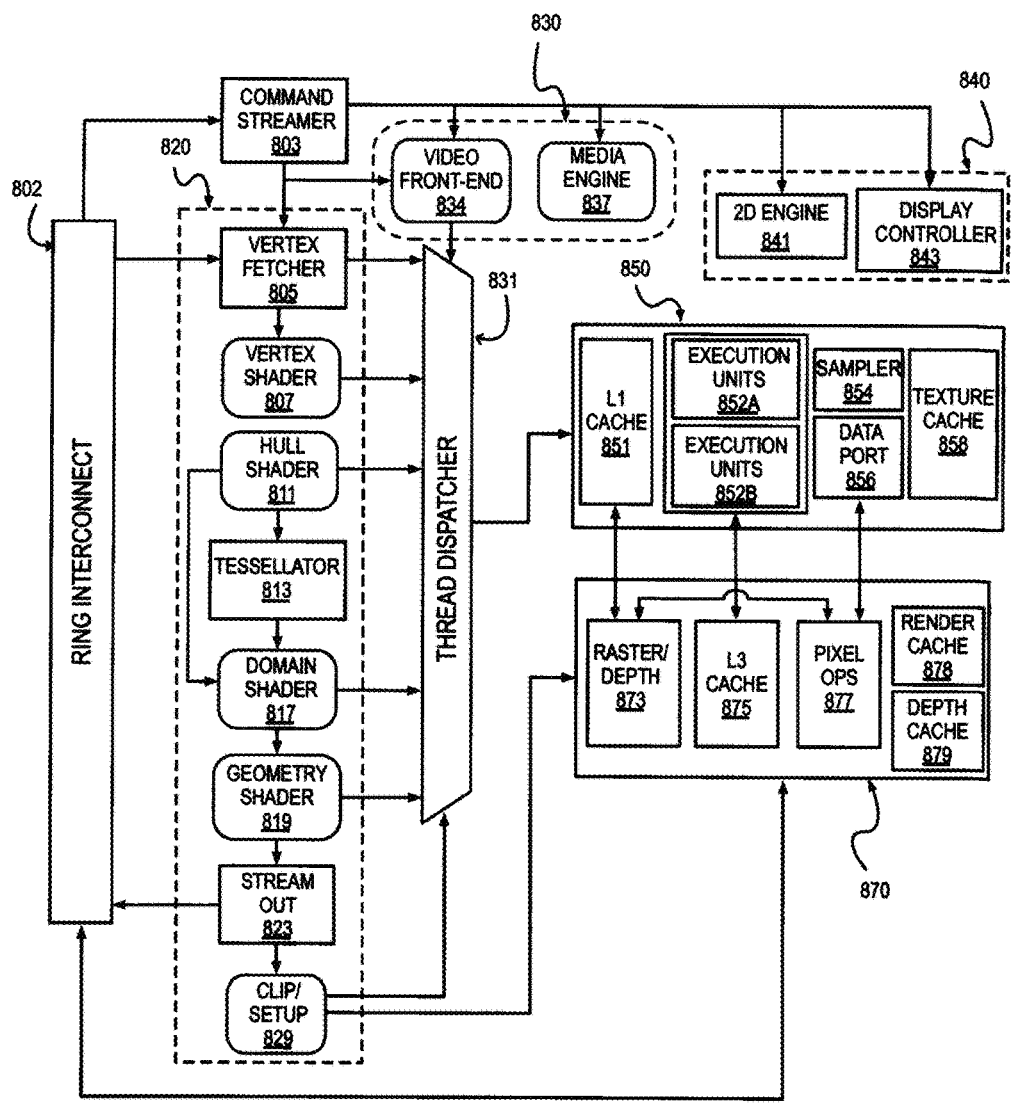
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
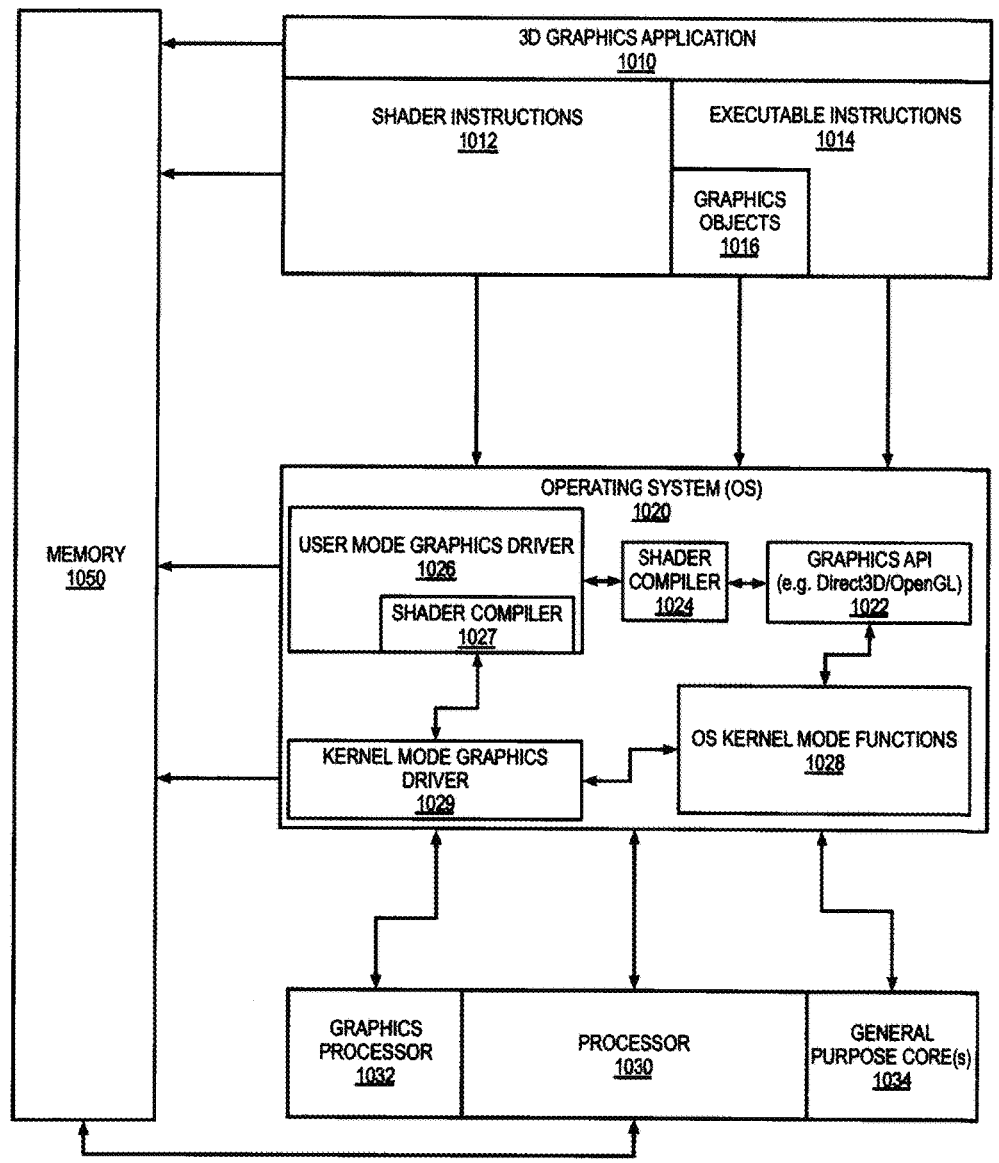
FIG. 10 illustrates exemplary graphics software architecture for a data processing system according to an embodiment.

FIG. 10 illustrates exemplary graphics software architecture 1000 for a data processing system according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Apparatus and Method for a High Throughput Rasterizer

Figure 11:
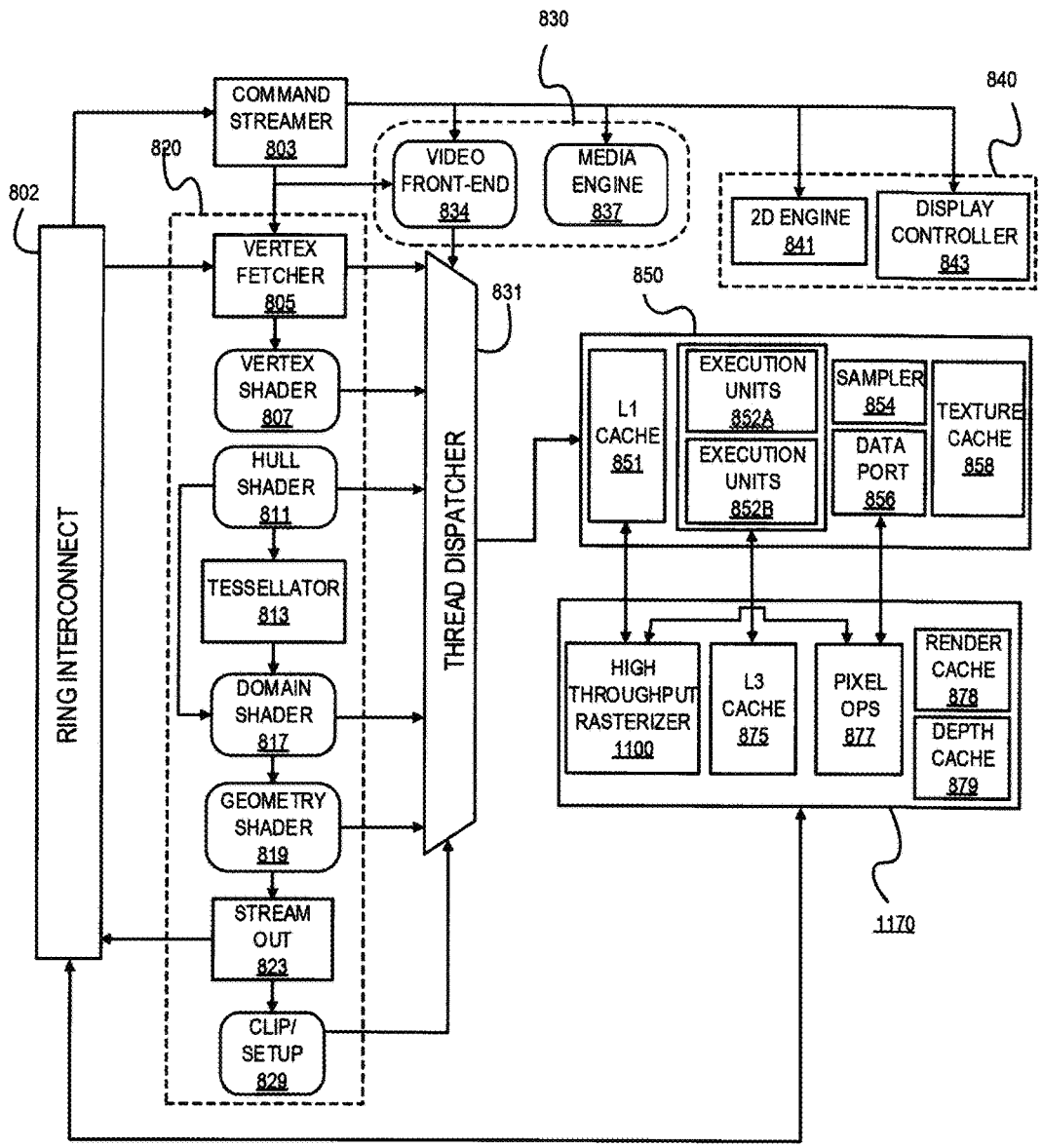
FIG. 11 illustrates a graphics processing architecture within which one embodiment of the high throughput rasterizer may be employed.

Embodiments of the invention may be implemented within a rasterizer of a graphics pipeline. FIG. 11 illustrates an exemplary graphics architecture which includes a high throughput rasterizer 1100 within a render output pipeline 1170 for implementing the techniques described below. The other components of the graphics processor architecture shown in FIG. 11 include a graphics pipeline 820, a media pipeline 830, a display engine 840, and thread execution logic 850, embodiments of which are described above with respect to FIG. 8. It should be noted, however, that the underlying principles of the invention are not limited to any specific graphics processor architecture.

As mentioned above, rasterizing is a critical task of a GPU in which an image described in a vector graphics format is converted into a raster image (e.g., pixels) for output on a display device. Rasterization often requires determining a list of lit samples of a primitive, which is a recurrent task that must be done efficiently to consume a minimum amount of power. Graphics techniques such as multisample anti-aliasing (MSAA) require a significant amount of graphics data to be processed without impacting the rendering time. Techniques have been applied to this problem but the throughput available using current solutions is insufficient to support current and future requirements.

Figure 12:
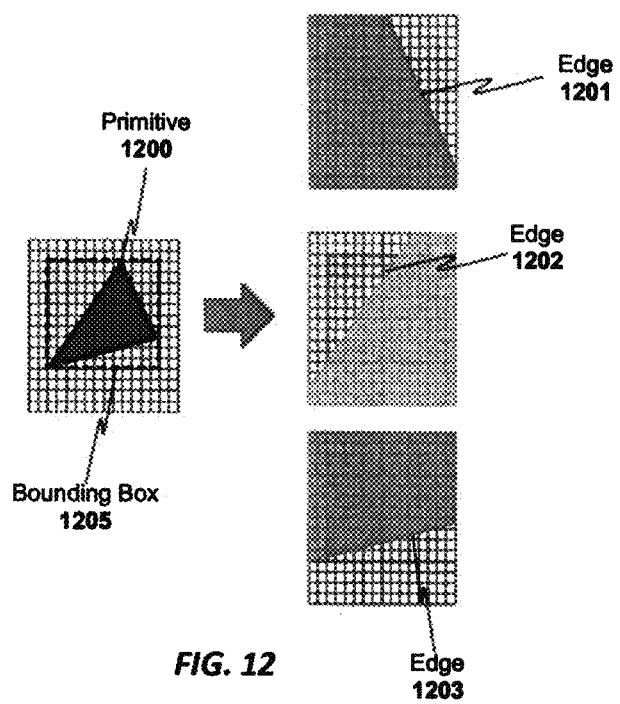
FIGS. 12-13 illustrate how primitives may be processed to determine edges during rasterization.

In operation, to produce the final sample mask, a primitive is divided into different edges. By way of example, FIG. 12 shows how a triangle primitive 1200 may be divided into three edges 1201-1203. Each edge 1201-1203 may be calculated independently and then the results may be merged to produce the final mask. As used herein, a bounding box 1205 comprises a region containing the entire primitive 1200 (i.e., pixels outside of the bounding box do not include any portion of the primitive).

Figure 13:
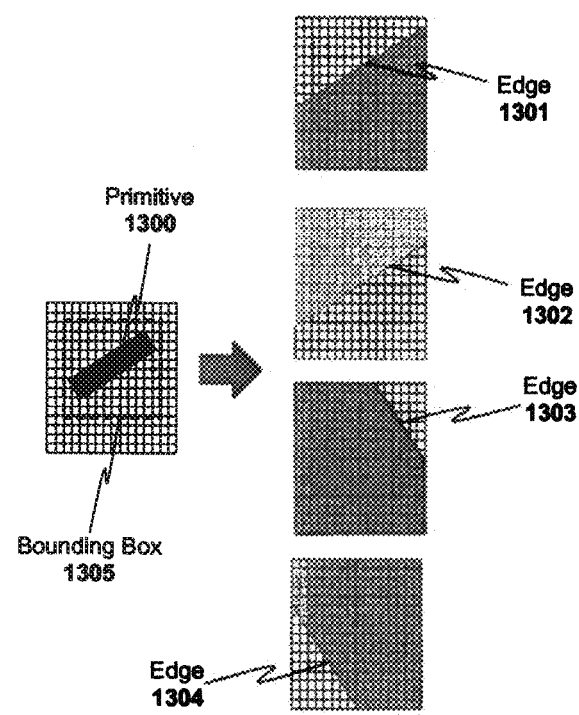

By way of another example, FIG. 13 shows how a wide line primitive 1300 may be divided into four different edges 1301-1304. Once again, each edge 1301-1304 is typically calculated independently, followed by a merging of the results to produce the mask. In the specific examples in FIGS. 12-13 and in certain embodiments described below, the primitive and results are encoded within a 16×16 block. However, the underlying principles of the invention are not limited to any particular block size.

In one embodiment, to determine whether a sample is inside ("lit") or outside the primitive ("not lit"), the following equation is used:

$$L_0(x,y) = Lo_{16 \times 16} + \Delta L_x + \Delta L_y \geq 0.$$

where $Lo_{16 \times 16}$ is the Lo value of the center of the current 16×16 pixel block and $\Delta L_x$ and $\Delta L_y$ specify the distance from the center of the 16×16 block to the sample (using X and Y coordinates, respectively). In one embodiment, if Lo(x, y) is zero or positive then the sample is lit and if it is negative then the sample is not lit.

Figure 14:
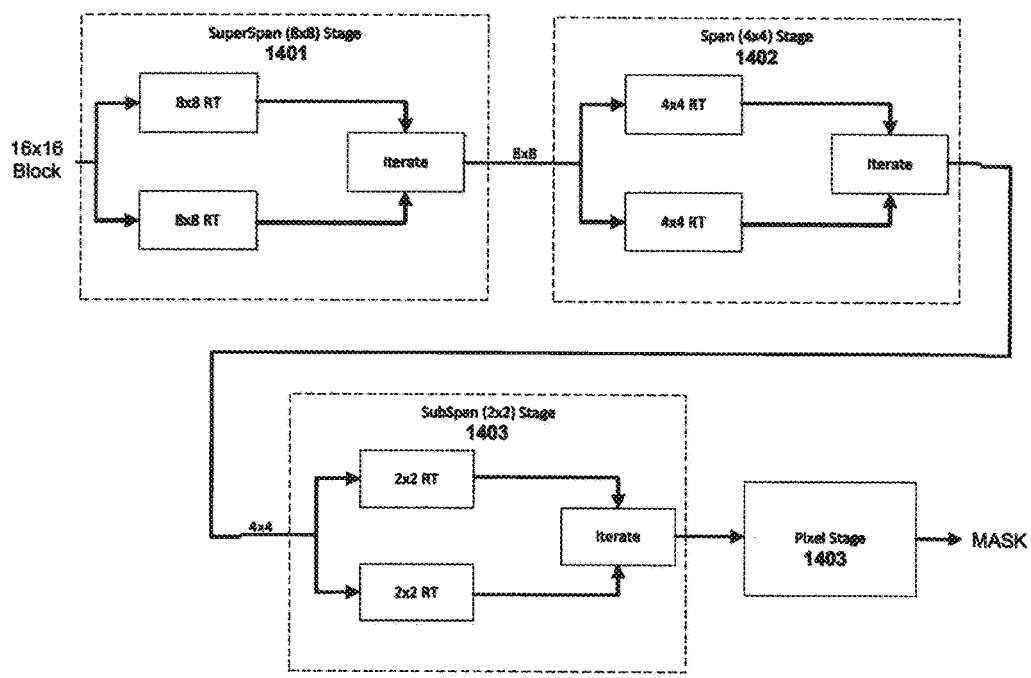
FIG. 14 illustrates an implementation in which a 16×16 pixel is subdivided into smaller blocks across multiple processing stages.

Existing solutions use a divide and conquer approach such as shown in FIG. 14 which take a 16×16 pixel block 1400 and divide it into four 8×8 blocks within a "superspan" stage 1401. Each 8×8 block is further divided into four 4×4 blocks within a "span" stage 1402 and each 4×4 block is divided into four 2×2 blocks within a "subspan" stage 1403. A final pixel stage 1404 then generates the mask 1405. One limitation of this approach is that it is not readily scalable and, as such, suffers from throughput problems.

In contrast, the embodiments of the invention described below use a parallel approach and calculate all the 4×4 blocks (sometimes referred to as "spans") at the same time. This may be accomplished, for example, by only calculating partial 4×4 blocks. In particular, if all samples within a 4×4 block are lit (the block is "fully covered") or if all samples are not lit (the block is "void") these spans are ignored. This may be done because fully lit blocks and void blocks do not contribute to an edge. This parallel approach is more scalable than prior implementations because more span calculators can be added.

One embodiment of the invention employs a span render scheme to improve the current windower throughput and power management. The high throughput rasterizer determines the status of all 16 spans (4×4 pixel blocks) of the 16×16 pixels input in parallel. After this first operation the rasterizer determines the partial spans (some samples lit and some not lit), fully covered spans (all samples lit), and void spans (no samples lit). Because fully covered and void span output values are known, the focus of subsequent processing stages is then on the partials, which are used to determine the primitive edges. In one embodiment, there may be up to 7 partials per edge.

As mentioned above, the number of edges depends on the primitive (e.g., triangle=3, rectangle=4). The rasterizer may support different MSAA including 1×, 2×, 4×, 8× and 16×. The circuits of one embodiment are capable of calculating 256 samples/clock. Based on the MSAA and the list of partial and fully covered spans, the rasterizer determines the list of lit and unlit samples.

Figure 15:
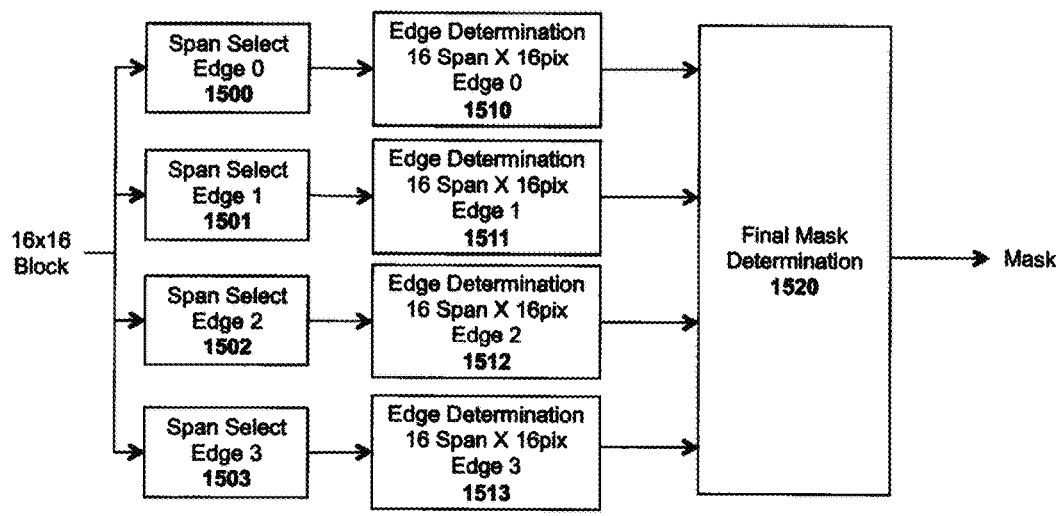
FIG. 15 illustrates one embodiment in which parallel processing is performed on each edge of a primitive.

In one embodiment of the invention, the windower analyzes only the partial spans and does it in a parallel way. FIG. 15 illustrates a block diagram of one embodiment of the invention. The first stage comprises a set of span select modules 1500-1503 to select a different set of spans for each edge. For example, span select module 1500 selects spans for edge 0; span select module 1501 selects spans for edge 1; span select module 1502 selects spans for edge 2; and span select module 1503 selects spans for edge 3. In one embodiment, each span select module 1500-1503 selects the set of partial spans having both lit and unlit samples (e.g., ignoring fully lit and void spans). In one embodiment, the span select modules 1500-1503 evaluate all the 4×4 spans in parallel.

Once the spans have been selected by the span select modules 1500-1503, the spans for each edge are passed to edge determination modules 1510-1513, respectively, which determine each edge and generate a mask for each edge. For example, edge determination module 1510 determines edge 0 and generates mask 0; edge determination module 1511 determines edge 1 and generates mask 1; edge determination module 1512 determines edge 2 and generates mask 2; and edge determination module 1513 determines edge 3 (if there is an edge 3) and generates mask 3. In one embodiment, each edge determination modules 1510-1513 operate on up to 16 span×16 pixels (256 samples) per clock to determine the location of each edge. In one embodiment, the mask determination modules 1510-1513 may implement different MSAA techniques including 1×, 2×, 4×, 8× and 16× (each of which may require different numbers of pixels for each edge). Based on the MSAA and the list of partial and fully covered spans, the edge determination modules 1510-1513 determine the list of lit and unlit samples for each edge. A final mask determination module 1520 then merges all masks in the last stage to obtain the final mask in which all edges have been identified (i.e., where all of the lit samples of the primitive are known).

The new techniques described above use 7 pipe stages to produce the final mask, while existing algorithms require 21 pipe stages. Table 1 shows the improvement in performance between the old and the new techniques, highlighting the pixels per clock processed using each MSAA. The table illustrates that the new techniques result in a 64× improvement for some cases.

TABLE 1

|  | Old Techniques Pixels/Clock | New Techniques Pixels/Clock |
|---|---|---|
| 1 × MSAA | 16 | 256 |
| 2 × MSAA | 16 | 128 |
| 4 × MSAA | 16 | 64 |
| 8 × MSAA | 8 | 32 |
| 16 × MSAA | 4 | 16 |
| Conservative Rast | 16 | 128 |
| Diamond Line | 4 | 256 |
| Wide Lines | 16 | 256 |

With respect to power usage, the distribution for 16×16, 8×8, 4×4 and pixels are illustrated in Table 2 below. Only 5% of the 16×16 are void or fully covered. Out of the 16×16 partial, 55% of the 8×8 are partial and then out of the partial 8×8, 51% of the 4×4 are partial. This means that the average triangle will have a partial 16×16, then there will be 2 partial 8×8 and in each of the partial 8×8 there will be 2 partial 4×4.

On average there will be 4 iterations to produce the 4×4 result. Based on Table 2 the usage of the different stages are: the 16×16 is used 94% of the time, then the 8×8 is used 55% of the time and 4×4 is used 51% of the time.

TABLE 2

|  | 16 × 16 | 8 × 8 | 4 × 4 | Pixel |
|---|---|---|---|---|
| Void/Fully | 5.15% | 44.24% | 48.27% | 89.32% |
| Partial | 94.85% | 55.76% | 51.73% | 10.68% |
| 1 Edge | 94.85% | 55.76% | 51.73% | 10.68% |
| 2 Edges | 82.39% | 51.44% | 49.43% | 10.58% |
| 3 Edges | 12.46% | 4.31% | 2.31% | 0.10% |

Table 3 illustrates results using the new parallel techniques described herein. It evaluates all 16 4×4 spans, to see if they are fully covered, partial covered or void. The fully covered and void cases do not require further calculations and the masks are known. Only the partial 4×4 require more calculations. Table 3 shows the average distribution of the 4×4 spans; it uses the same inputs of Table 2. Table 3 shows that 72% of the 4×4 the mask is known; 10% will be required to calculate two edges; and only 1.2% will be required to calculate 3 edges. Thus, edge 1 is on 28% of the time, edge 2 is on 10% and edge 3 is on only 1.2% of the time.

TABLE 3

|  | 16 × 16 | 4 × 4 |
|---|---|---|
| Void/Fully | 5.15% | 72.64% |
| Partial | 94.85% | 27.36% |
| 1 Edge | 94.85% | 27.36% |
| 2 Edges | 63.39% | 10.16% |
| 3 Edges | 12.46% | 1.22% |

Figure 16:
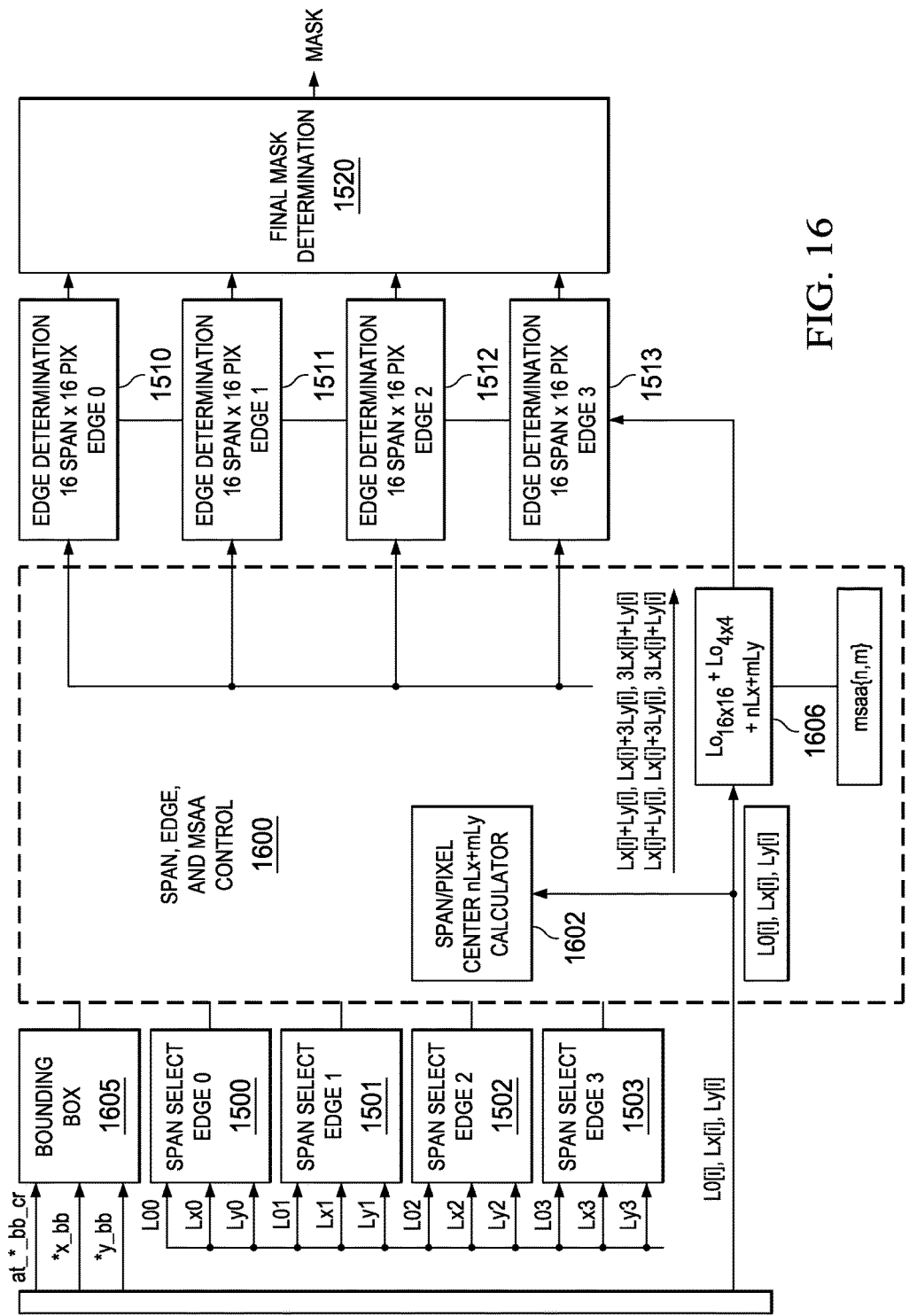
FIG. 16 illustrates additional details for one embodiment in which parallel processing is performed on each edge of a primitive.

FIG. 16 illustrates additional details of one embodiment of the invention which includes the span select modules 1500-1503 and edge determination modules 1510-1513 described above. In addition, bounding box logic 1605 contains the information about the bounding box rectangle that contains the primitive; anything outside of the bounding box is void (exemplary bounding boxes 1205, 1305 are illustrated in FIGS. 12 and 13, respectively). In one embodiment, the bounding box logic 1605 determines the spans that are out of the bounding box and mark them as void. The span select modules 1500-1503 determine the partial, void and fully covered spans. In one embodiment, they use the same equation:

$$L_0(x,y)=Lo_{16\times16}+\Delta L_x+\Delta L_y \geq 0.$$

In one embodiment, the span select modules 1500-1503 check the 4 corners of the 4×4 spans and use the symmetry to reduce the number of compare circuits required for rasterization. Span, Edge, and MSAA control logic 1600 implement span/pixel center calculator 1602 which calculates the values for nLx+mLy and module 1606 determines values for $Lo_{16\times16}+Lo_{4\times4}+nLx+mLy$ according to a specified MSAA. The output of module 1606 is used to control each of the edge determination modules 1510-1513.

Figure 17:
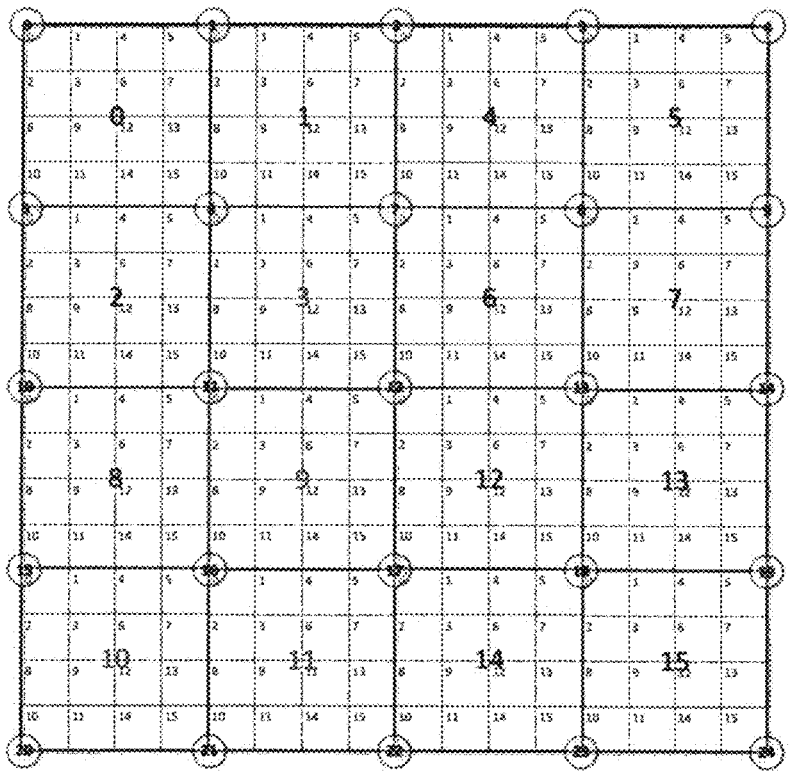
FIG. 17 illustrates symmetry which is utilized to perform more efficient rasterization in one embodiment of the invention.

FIG. 17 illustrates the symmetry that exists in a 16×16 block and which is utilized to improve efficiency in one embodiment of the invention. In particular, only 12 compares are required per edge to evaluate the entire 16×16 because of the following known equalities between Lo values:

$$Lo_0=-Lo_{24}=-8Lx-8Ly$$

$$Lo_1=-Lo_{23}=-4Lx-8Ly$$

$$Lo_2=-Lo_{22}=-8Ly$$

$$Lo_3=-Lo_{21}=4Lx-8Ly$$

$$Lo_4=-Lo_{20}=8Lx-8Ly$$

$$Lo_5=-Lo_{19}=-8Lx-4Ly$$

$$Lo_6=-Lo_{18}=Lo_0/2$$

$$Lo_7=-Lo_{17}=-4Ly$$

$$Lo_8=-Lo_{16}=-Lo_4/2$$

$$Lo_9=-Lo_{15}=8Lx-4Ly$$

$$Lo_{10}=-Lo_{14}=-8Lx$$

$$Lo_{11}=-Lo_{13}=-4Lx$$

$$Lo_{12}=0$$

Thus, $L_0(x,y)=Lo_{16\times16}-8Lx-8Ly \geq 0$ for both $Lo_0$ and $-Lo_{24}$. The values for $-8Lx$ and $-8Ly$ could be positive or negative. If both are positive the corner is lit and if both are negative the corner is not lit, and there is no need to compare. But the complementary corner will have different signs and the two values need to be compared. This reduces the number of compares in half.

Then, in one embodiment, to calculate the Lo for a specific sample the equation is:

$$L_0(x,y)=Lo_{16\times16}+Lo_{4\times4}+\Delta L_{MSAA}+\Delta Lo_{pixel}>0.$$

Where $Lo_{16\times16}$ is an input of the block and is the Lo value for the center of the 16×16 block. The $Lo_{4\times4}$ value is the Lo from the 16×16 center to the 4×4 center. The $Lo_{pixel}$ value is the Lo from the 4×4 center to the pixel center. The $L_{MSAA}$ value is the distance from the pixel center to the sample.

Figure 18A:
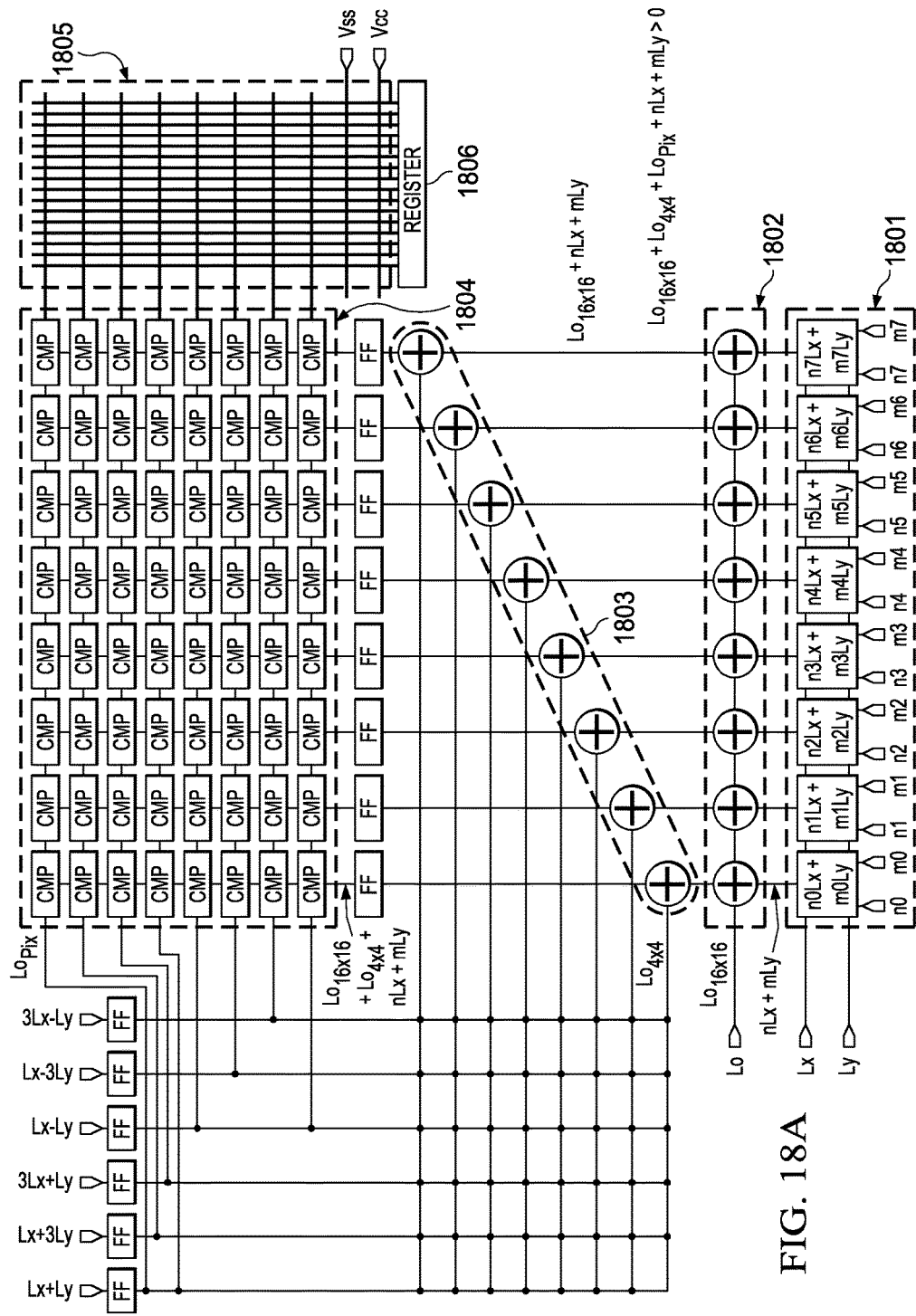
FIGS. 18A-B illustrates additional logic including a set of comparators employed in one embodiment of the invention.
Figure 18B:
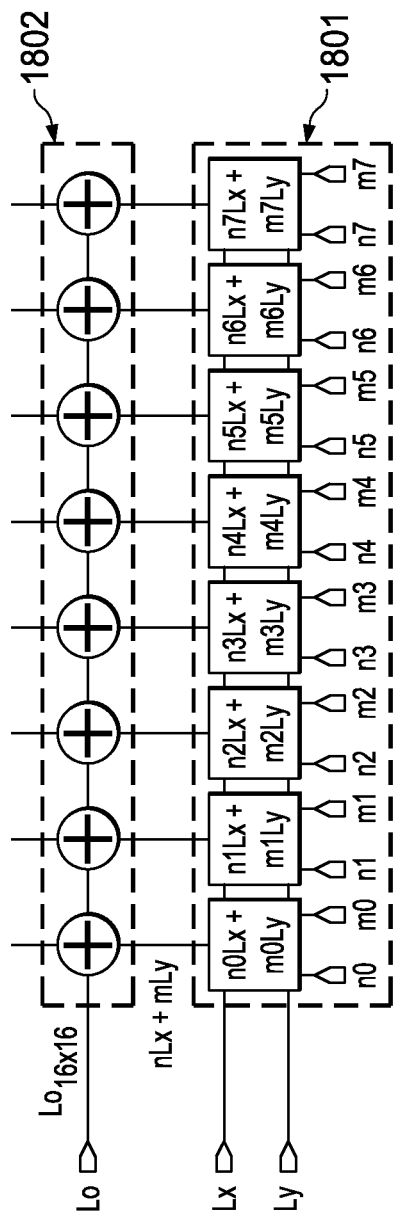

FIGS. 18A-B illustrate additional details of a circuit for performing the foregoing calculations. In particular, circuit block 1801 performs a plurality of addition and multiplication operations to arrive at the values of nLx+mLy. A first set of adders 1802 then adds these results to $Lo_{16\times16}$ to arrive at the result: $Lo_{16\times16}+nLx+mLy$. A second set of adders 1803 then adds these results to $Lo_{4\times4}$ to arrive at the result: $Lo_{16\times16}+Lo_{4\times4}+nLx+mLy$. A set of 64 comparators 1804 then perform comparisons with these results and one of the $Lo_{pixel}$ values (Lx+Ly, Lx+3Ly, 3Lx+Ly, Lx−Ly, Lx−3Ly, 3Lx−Ly) to determine whether $Lo_{16\times16}+Lo_{4\times4}+Lo_{pixel}+nLx+mLy>0$.

Figure 19:
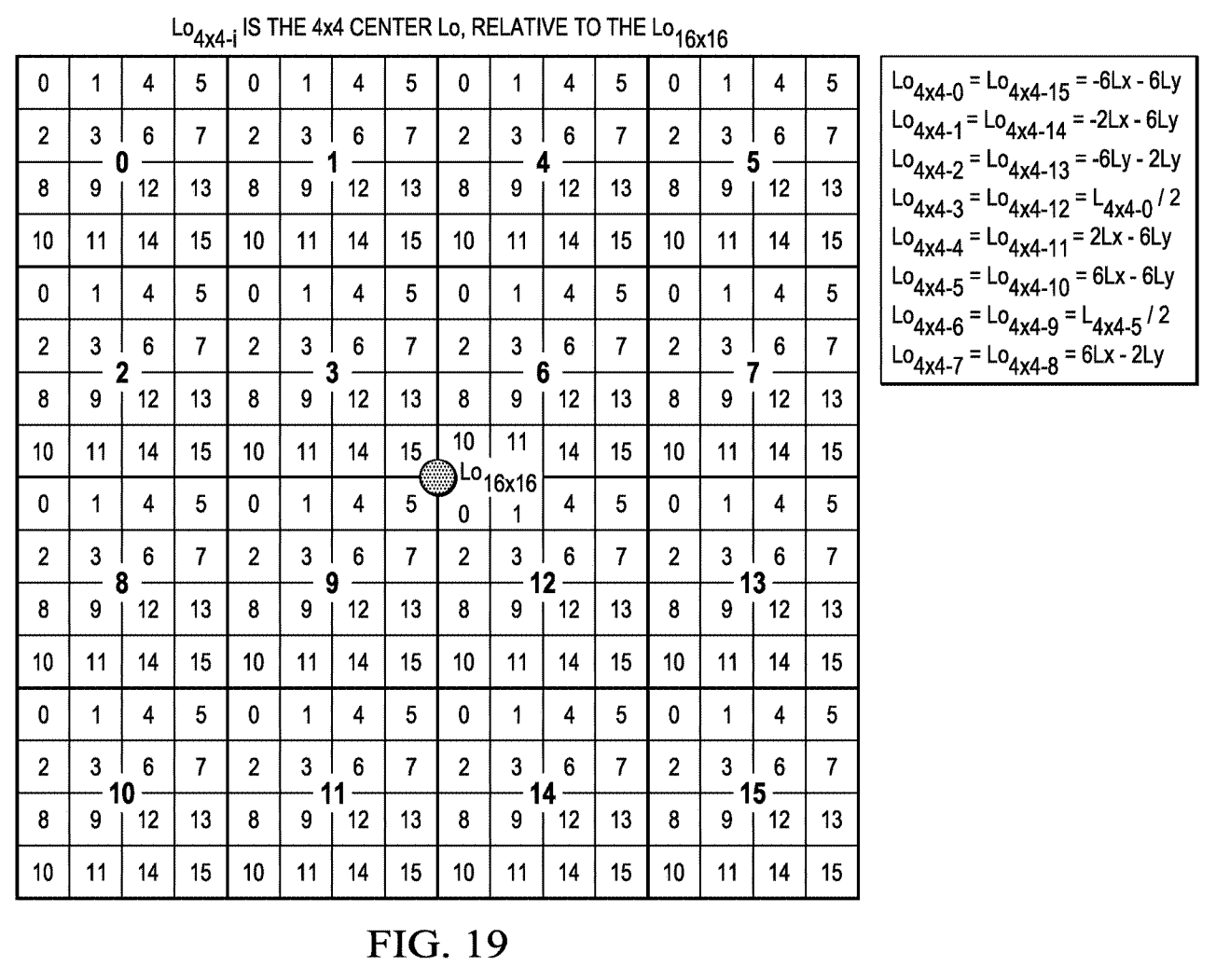

FIG. 19 shows that the $Lo_{4\times4}$ symmetry which is used to reduce the number of multipliers needed to calculate all 16 values. In particular, because of the symmetry, the following equalities may be utilized (where $Lo_{4\times4-i}$ is the 4×4 center Lo, relative to the $Lo_{16\times16}$):

$$Lo_{4\times4-0}=-Lo_{4\times4-15}=-6Lx-6Ly$$

$$Lo_{4\times4-1}=-Lo_{4\times4-14}=-2Lx-6Ly$$

$$Lo_{4\times4-2}=-Lo_{4\times4-13}=-6Ly-2Ly$$

$$Lo_{4\times4-3}=-Lo_{4\times4-12}=L4\times4-o/2$$

$$Lo_{4\times4-4}=-Lo_{4\times4-11}=2Lx-6Ly$$

$$Lo_{4\times4-5}=-Lo_{4\times4-10}=6Lx-6Ly$$

$$Lo_{4\times4-6}=-Lo_{4\times4-9}=L4\times4-5/2$$

$$Lo_{4\times4-7}=-Lo_{4\times4-8}=6Lx-2Ly$$

Figure 20:
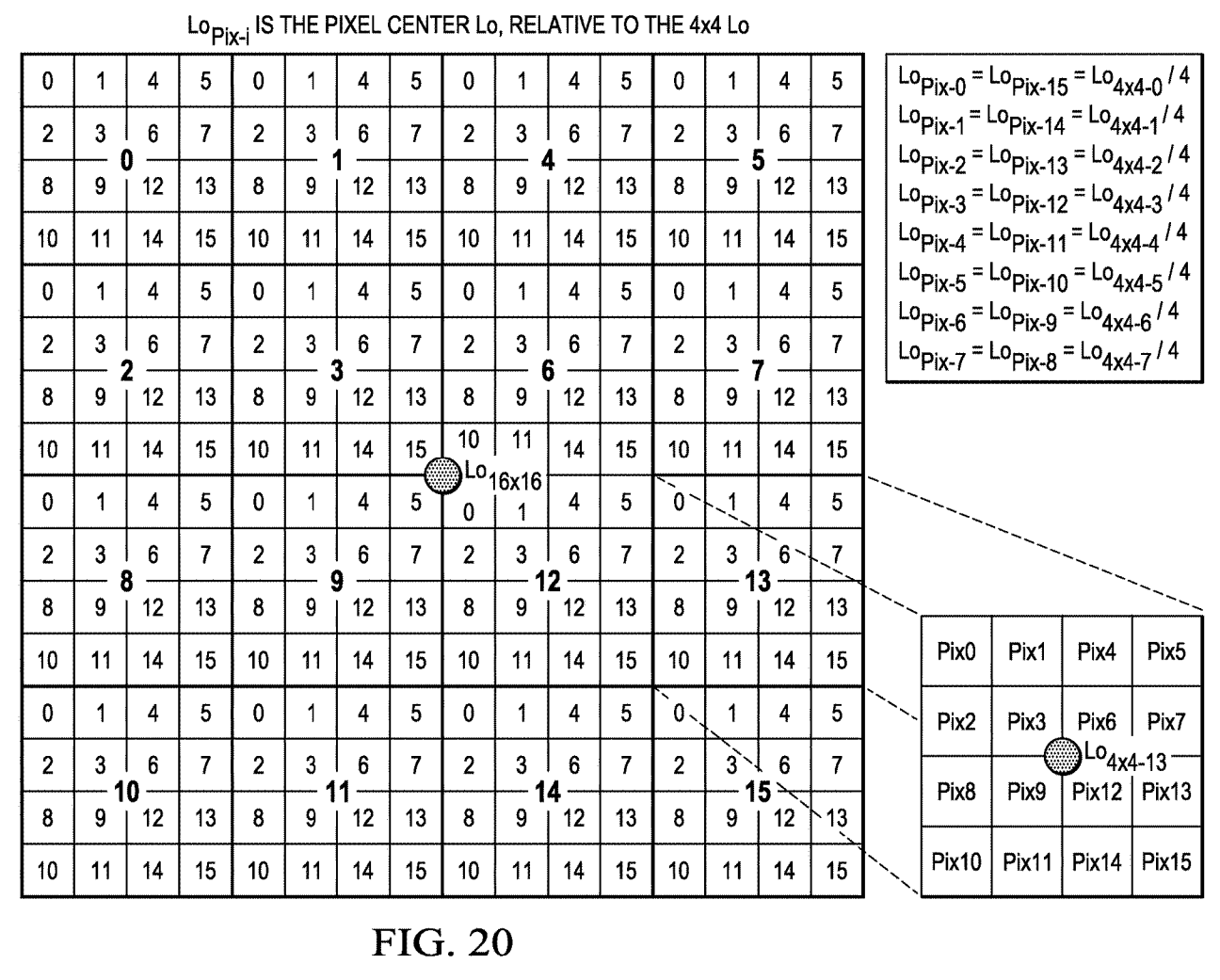

FIG. 20 shows another property which is that $Lo_{pixel}=Lo_{4\times4}/4$. FIG. 18A illustrates how these values are used for $Lo_{pixel}$ as input to the comparators 1804. In addition, these values may be used inputs to the adders for the equation $Lo_{16\times16}+\Delta Lo_{4\times4}+\Delta L_{MSAA}>\Delta L0_{Pixel}$. The same symmetry property that is used in the first stage to calculate the partial spans may be used to reduce the number of comparators to 8. Thus, FIG. 18A illustrates that only 8 columns of comparators 1804 may be used to arrive at the 16 pixel values. Note that while 64 comparators 1804 are illustrated in FIG. 18A, one set of 8 comparators may be used 8 times in succession to perform the calculations described herein.

In one embodiment, the final mask calculation block 1805 executes a logical AND to all the outputs and generates the final mask which may be stored in a register 1806 as illustrated in FIG. 18A.

Figure 21:
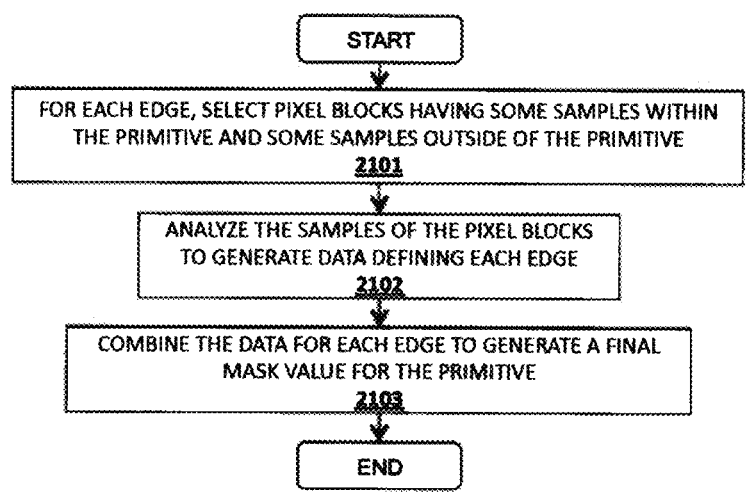
FIG. 21 illustrates a method in accordance with one embodiment of the invention.

A method in accordance with one embodiment of the invention is illustrated in FIG. 21. The method may be implemented with the context of the architectures described above, but is not limited to any particular architecture.

At 2101, a plurality of pixel blocks associated with edges of a primitive are selected based on the pixel blocks having samples which are both inside and outside of the primitive. As mentioned above, for example, in one embodiment 4×4 spans which are fully covered and void may be identified and ignored. At 2102, the samples within each selected plurality of pixel blocks are analyzed to generate data identifying each edge of the primitive. In the embodiments described above, for example, the specific location of each edge may be determined by edge determination logic 1510-1513. Finally, at 2103, the edge data determined for each edge of the primitive is combined and a final mask is generated representing the primitive.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   block selection circuitry to select a plurality of pixel blocks associated with edges of a primitive, the plurality of pixel blocks selected based on the pixel blocks having samples which are both inside and outside of the primitive; and
   edge determination circuitry to analyze samples of the plurality of pixel blocks selected by the block selection circuitry and responsively generate data identifying each edge of the primitive; and
   final mask determination circuitry to combine the data identifying each edge and generate a final mask representing the primitive;
   wherein the block selection circuitry selects the plurality of pixel blocks from a 16×16 sample block, the block selection circuitry to utilize symmetry within the 16×16 sample block to reduce a number of compare operations required to select the plurality of pixel blocks and identify each edge.

2. The apparatus as in claim 1 wherein the pixel blocks selected by the block selection circuitry comprise 4×4 spans.

3. The apparatus as in claim 2 wherein the block selection circuitry comprises:
   a first span selection module to select a first set of spans for a first edge;
   a second span selection module to select a second set of spans for a second edge;
   a third span selection module to select a third set of spans for a third edge; and
   a fourth span selection module to select a fourth set of spans for a fourth edge.

4. The apparatus as in claim 3 wherein the primitive is encoded within a 16×16 pixel block comprising 16 4×4 spans from which the first, second, third, and fourth span selection circuitry is to select.

5. The apparatus as in claim 3 wherein the edge determination circuitry comprises:
   a first edge determination module to determine a first edge associated with the first set of spans;
   a second edge determination module to determine a second edge associated with the second set of spans;
   a third edge determination module to determine a third edge associated with the third set of spans; and a fourth edge determination module to determine a fourth edge associated with the fourth set of spans.

6. The apparatus as in claim 1 wherein the edge determination circuitry further comprises multi-sample anti-aliasing (MSAA) circuitry to perform MSAA when identifying each edge of the primitive.

7. The apparatus as in claim 6 wherein the MSAA circuitry is configurable to perform either 1×, 2×, 4×, 8×, or 16×MSAA.

8. The apparatus as in claim 1 further comprising:
bounding box circuitry to determine a bounding box for the primitive, the bounding box circuitry to generate data defining a rectangle which contains the primitive, wherein any samples outside of the bounding box are void.

9. The apparatus as in claim 1 wherein each pixel block comprises a 4×4 span and wherein the block selection circuitry is to determine void spans which contain no samples of the primitive, fully covered spans with all samples from the primitive, and partial spans which include samples which are inside the primitive and samples which are outside of the primitive.

10. The apparatus as in claim 1 wherein the number of compare operations required by the block selection circuitry to select the plurality of pixel blocks for identifying each edge is reduced to 12.

11. The apparatus as in claim 10 wherein the edges are identified by the edge determination circuitry using the equation: $L_0(x,y)=Lo_{16\times16}+\Delta L_x+\Delta L_y \geq 0$ which, if $\geq 0$ identifies a sample within the primitive and, if not, identifies a sample outside of the primitive.

12. The apparatus as in claim 11 wherein the number of compare operations performed by the edge determination circuitry is reduced to 12 based on the following equalities within the 16×16 sample block:

$$Lo_0 = -Lo_{24} = -8Lx - 8Ly;$$

$$Lo_1 = -Lo_{23} = -4Lx - 8Ly;$$

$$Lo_2 = -Lo_{22} = -8Ly;$$

$$Lo_3 = -Lo_{21} = 4Lx - 8Ly;$$

$$Lo_4 = -Lo_{20} = 8Lx - 8Ly;$$

$$Lo_5 = -Lo_{19} = -8Lx - 4Ly;$$

$$Lo_6 = -Lo_{18} = Lo_0/2;$$

$$Lo_7 = -Lo_{17} = -4Ly;$$

$$Lo_8 = -Lo_{16} = -Lo_4/2;$$

$$Lo_9 = -Lo_{15} = 8Lx - 4Ly;$$

$$Lo_{10} = -Lo_{14} = -8Lx;$$

$$Lo_{11} = -Lo_{13} = -4Lx; \text{ and}$$

$$Lo_{12} = 0.$$

13. The apparatus as in claim 12 wherein the edge determination circuitry uses the following equation to determine Lo to a specific sample $L_0(x,y)=Lo_{16\times16}+Lo_{4\times4}+\Delta L_{MSAA}+\Delta Lo_{pixel}>0$, where $Lo_{16\times16}$ is the Lo value for the center of the 16×16 sample block; the $Lo_{4\times4}$ value is the Lo from the 16×16 center to a 4×4 span center; the $Lo_{pixel}$ value is the Lo from the 4×4 span center to a pixel center; and the $L_{MSAA}$ value is a distance from the pixel center to a sample.

14. The apparatus of claim 1, wherein a maximum number of the plurality of pixel blocks selected by the block selection circuitry for each edge of the primitive is 7.

15. A method comprising:
selecting a plurality of pixel blocks associated with edges of a primitive, the plurality of pixel blocks selected based on the pixel blocks having samples which are both inside and outside of the primitive; and
analyzing the samples within each selected plurality of pixel blocks to generate data identifying each edge of the primitive; and
combining the data identifying each edge and generating a final mask representing the primitive;
wherein the plurality of pixel blocks is selected from a 16×16 sample block and wherein symmetry within the 16×16 sample block is utilized to reduce a number of compare operations required to select the plurality of pixel blocks and identify each edge.

16. The method as in claim 15 wherein the plurality of pixel blocks selected comprise 4×4 spans.

17. The method as in claim 16 wherein selecting further comprises:
selecting a first set of spans for a first edge;
selecting a second set of spans for a second edge;
selecting a third set of spans for a third edge; and
selecting a fourth set of spans for a fourth edge.

18. The method as in claim 17 wherein the primitive is encoded within a 16×16 pixel block comprising 16 4×4 spans from which the first, second, third, and fourth sets of spans are to be selected.

19. The method as in claim 17 wherein analyzing the samples and generating data identifying each edge of the primitive comprises:
determining a first edge associated with the first set of spans;
determining a second edge associated with the second set of spans;
determining a third edge associated with the third set of spans; and
determining a fourth edge associated with the fourth set of spans.

20. The method as in claim 15 further comprising:
performing multi-sample anti-aliasing (MSAA) when generating the data identifying each edge of the primitive.

21. The method as in claim 20 further comprising:
performing either 1×, 2×, 4×, 8×, or 16×MSAA.

22. The method as in claim 15 further comprising:
determining a bounding box for the primitive by generating data defining a rectangle which contains the primitive, wherein any samples outside of the bounding box are void.

23. The method as in claim 15 wherein each pixel block comprises a 4×4 span, the method further comprising:
determining void spans which contain no samples of the primitive, fully covered spans with all samples from the primitive, and partial spans which include samples which are inside the primitive and samples which are outside of the primitive, the partial spans comprising the plurality of pixel blocks selected based on the pixel blocks having samples which are both inside and outside of the primitive.

24. The method as in claim 15 wherein 12 compare operations are required to select the plurality of pixel blocks for identifying each edge.

* * * * *